(12) United States Patent
Duvall

(10) Patent No.: US 8,086,215 B2
(45) Date of Patent: *Dec. 27, 2011

(54) METHOD OF AND APPARATUS FOR UTILIZING GEOGRAPHICALLY SPREAD CELLULAR RADIO NETWORKS TO SUPPLEMENT MORE GEOGRAPHICALLY LIMITED STOLEN VEHICLE RECOVERY NETWORKS IN ACTIVATION OF RADIO TRACKING AND RECOVERY OF SUCH VEHICLES

(75) Inventor: William Duvall, Sudbury, MA (US)

(73) Assignee: LoJack Operating Company LP, Westwood, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/381,381

(22) Filed: Mar. 11, 2009

(65) Prior Publication Data

US 2009/0181697 A1    Jul. 16, 2009

Related U.S. Application Data

(63) Continuation of application No. 10/150,818, filed on May 17, 2002, now Pat. No. 7,536,169.

(51) Int. Cl.
*H04W 4/00* (2009.01)

(52) U.S. Cl. ........... 455/404.1; 340/426.19; 340/539.13; 342/357.07

(58) Field of Classification Search ............... 455/404.1; 342/357.08; 340/426.19, 539.13
See application file for complete search history.

(56) References Cited

U.S. PATENT DOCUMENTS

| | | | |
|---|---|---|---|
| 4,818,998 A | | 4/1989 | Apsell et al. |
| 4,908,629 A | | 3/1990 | Apsell et al. |
| 5,003,317 A | * | 3/1991 | Gray et al. ................... 342/457 |
| 5,155,689 A | | 10/1992 | Wortham |
| 5,515,285 A | | 5/1996 | Garrett, Sr. et al. |
| 5,555,286 A | | 9/1996 | Tendler |
| 5,838,237 A | * | 11/1998 | Revell et al. ............... 340/573.1 |
| 5,895,436 A | * | 4/1999 | Savoie et al. ................. 701/214 |
| 5,917,423 A | | 6/1999 | Duvall |
| 6,370,475 B1 | | 4/2002 | Breed et al. |

FOREIGN PATENT DOCUMENTS

| | | |
|---|---|---|
| TW | 413366 | 11/2000 |
| WO | WO 97/45962 | 12/1997 |
| WO | WO 01/32480 A1 | 5/2001 |

* cited by examiner

*Primary Examiner* — Pierre-Louis Desir
(74) *Attorney, Agent, or Firm* — Iandiorio Teska & Coleman

(57) ABSTRACT

A method of expanding the activation and tracking capability of a limited number of stolen vehicle recovery dedicated radio-frequency networks activated from a control center upon notification of the theft of the vehicle includes supplementarily using more numerous widely geographically provided cellular-telephone frequency band networks to respond to the control center to indicate rough location of the stolen vehicle, while the recovery networks provide fine tracking of the vehicle for recovery.

6 Claims, 2 Drawing Sheets

METHOD OF AND APPARATUS FOR UTILIZING GEOGRAPHICALLY SPREAD CELLULAR RADIO NETWORKS TO SUPPLEMENT MORE GEOGRAPHICALLY LIMITED STOLEN VEHICLE RECOVERY NETWORKS IN ACTIVATION OF RADIO TRACKING AND RECOVERY OF SUCH VEHICLES

RELATED APPLICATIONS

This application is a continuation of prior U.S. patent application Ser. No. 10/150,818 filed May 17, 2002 now U.S. Pat. No. 7,536,169 (which is incorporated herein by this reference) and claims the benefit of and priority to U.S. patent application Ser. No. 10/150,818 under 35 U.S.C. §§119, 120, 363, 365, and 37 C.F.R. §§1.55 and 1.78.

FIELD OF THE INVENTION

The invention relates generally to the radio tracking of stolen vehicles and the like, being more particularly concerned with accelerating the time required to alert the vehicle owner or others of unauthorized movement or theft, in order to enable the initiation of the police or other vehicle tracking and recovery operations as described, for example, in U.S. Pat. Nos. 4,818,998 and 4,908,629, and as provided by the LoJack® system of the assignee of the present invention, and as also described in, for example, the assignee's 1989 brochure entitled "LoJack Stolen Vehicle Police Recovery Network."

BACKGROUND OF THE INVENTION

As described in said patents and publication, upon receiving notice of the unauthorized movement of an owner's vehicle equipped with such a "LoJack" or similar system, the owner so notifies the police or other recovery authority to put in operation dedicated radio network transmitters for querying vehicle-installed transponders that then become activated to transmit radio-tracking signals to police or other recovery vehicles for tracking the stolen vehicle and recovering of the same.

Systems for automatically sensing the unauthorized tampering, use, or more generally the movement of the vehicle include, for example, those described in U.S. Pat. No. 5,917,423 of said assignee. Systems For Aiding The Alerting Of The Owner Of The Vehicle Of Its Theft—so-called "uplink" notification—are also described in said assignee's PCT application PCT/GB 97/01444 published on or about May 25, 2000.

While the above-referenced radio tracking techniques are widely and highly successfully in use, permitting recoveries by the police in up to about a few hours or so on the average, it is the delay in notifying the owner of the vehicle theft, so as to put the recovery technique in motion, that is the weak link in the recovery process. There is, moreover, an economic limit on the feasible number and locations of dedicated vehicle recovery radio networks (generally of VHF frequencies), and thus a relatively limited geographic area for alerting recovery. The present invention, however, uses existing widely geographically spread cellular telephone radio networks (UHF frequencies) as supplement to the limited radio recovery networks to enlarge the effected area of recovery activation, both in terms of notification of vehicle theft and in providing rough or coarse location of the zone in which the stolen vehicle is present, and then the facility to bring the tracking vehicle into that zone for fine tracking by the "LoJack" or similar recovery system.

A fundamental issue that the concept of the invention addresses is how to activate a stolen vehicle transponder when the vehicle is out of its "home" recovery network coverage area and frequency, and is, indeed, in a wide coverage area where other radio networks exist (as for other uses, such as cellular telephone) that have completely different frequencies. The invention teaches how to supplement the limited coverage area of the vehicle recovery transmitter network with the facilities of the widely geographically existing cellular radio telephone networks and in a novel manner that extends the activation and tracking capabilities of the recovery network. This is effected by equipping the vehicle not only with a VHF transponder responsive with code to the radio recovery network transmitter queries, but also a vehicle-equipped cellular telephone frequency transceiver, responsive also with identification to the cellular radio network query. The site of the cellular radio network receiving the vehicle transceiver thus identifies itself to the control center (coarse location) which enables the tracking vehicle to proceed into that area locally and either with the cooperation of the radio recovery network transmitter if within range, or by carrying a local radio recovery transmitter in the recovery vehicle, activating the vehicle transponder to enable tracking of the stolen vehicle locally.

BRIEF SUMMARY OF THE INVENTION

The principal object of the present invention, thus, is to provide a method of and apparatus for the activation and tracking coverage of stolen vehicles well beyond the capability of a dedicated local radio recovery network, such as the "LoJack" type system, by enabling the use of the supplementary assistance of the widely geographically spread cellular telephone network to provide coarse location information that may extend well outside the range of the recovery network reach.

Other and further objects will be explained hereinafter and are more particularly delineated in the appended claims.

In summary, however, the invention embraces a method of utilizing the relatively wide-geographically spread cellular radio network to supplement more limited stolen vehicle recovery radio network sites in activation of radio tracking and recovery of such a vehicle, that comprises, equipping the vehicle with both a transponder for replying with a unique reply code transmission to a query form the recovery networks and a transceiver for replying with unique identification transmission to a query from the cellular network; upon confirming vehicle theft at a control centre, instructing both the recovery network and the cellular network to send their respective queries to the respective transponder and transceiver of the vehicle; receiving from the vehicle transceiver said unique identification transmission at a site of the cellular network and sending from such site an identifying number thereof to the control center for providing over the wide geography of the cellular network, rough location guidance information to a recovery vehicle; and receiving from the vehicle transponder at such recovery vehicle its reply code transmission to enable fine tracking by the recovery vehicle of the stolen vehicle.

Preferred and best mode implementations are later detailed.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings.

The invention will now be explained in connection with the accompanying drawings, FIG. 1 of which is a schematic diagram of the overall operating system of the invention.

DETAILED DESCRIPTION OF THE INVENTION

Figure 1:
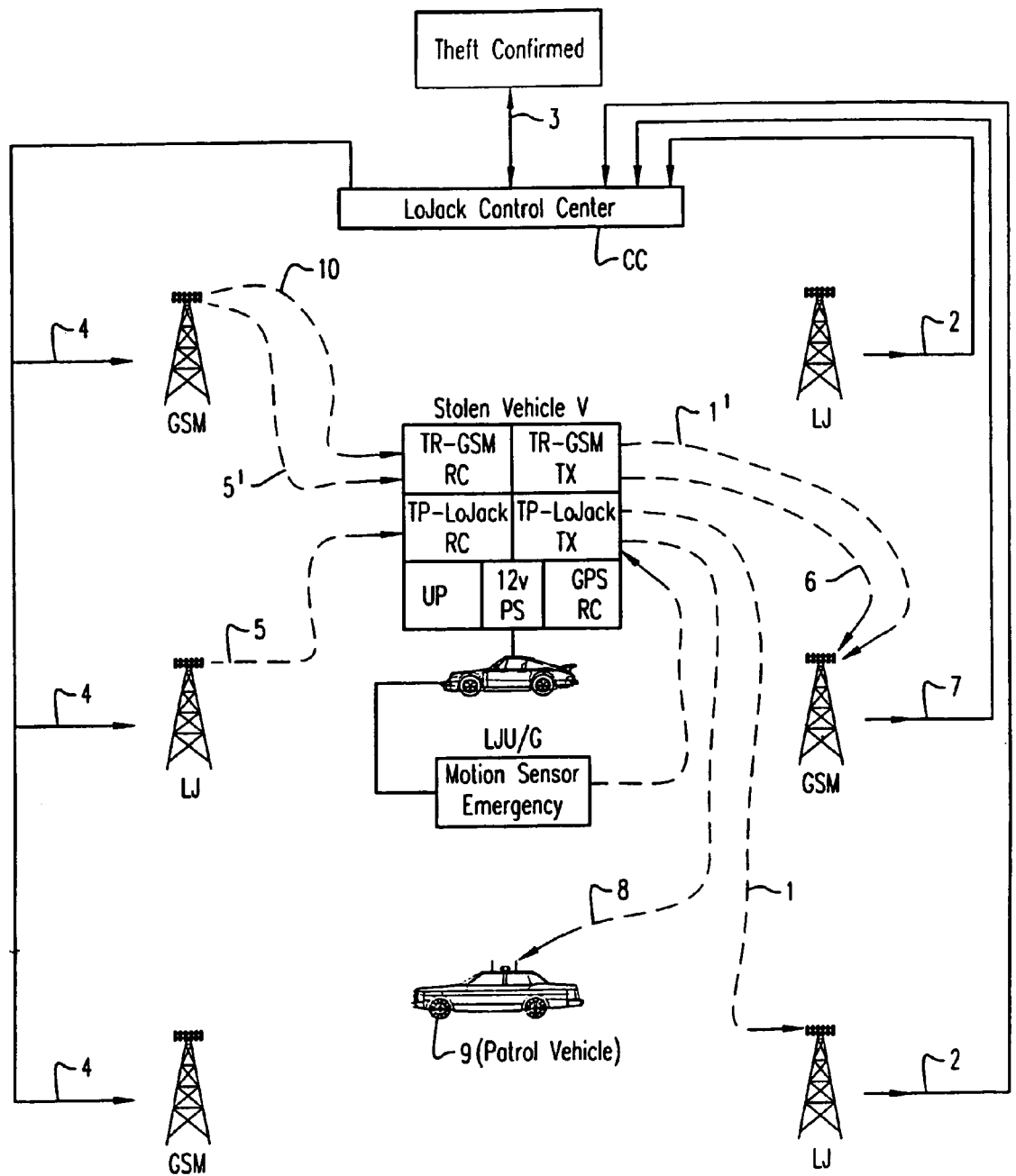

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Referring to FIG. 1, a radio tracking recovery system as of the before-described preferred "LoJack" type is shown comprising a dedicated radio vehicle recovery (VHF—say, 160-174 megahertz) antenna network of three towers labeled "L J" (two on the right and one on the left) working in cooperation with a control center CC. An uplink technique, earlier described, may sense vehicle movement and send an early warning message at "UP" from the vehicle that carries a vehicle-equipped transponder TP (LoJack RC"—"LoJack TX").

The uplink message is shown transmitted along path 1 to the tower LJ (bottom right) so that the tower may alert the control center CC via path 2—for example, a telephone line or the like. The control center then alerts the vehicle owner or customer by way of phone page, e-mail, etc. of the possible theft, so that confirmation of the theft may be made by the owner to the control center, as indicated at 3. Alternatively, if there is no uplink provided, when the owner is otherwise apprised of the missing vehicle, the owner directly contacts the control center (police) at 3.

The control center then sends an activation command along line 4 to the tower LJ (shown as the left-hand tower) which in turn sends an interrogation signal or query at 5 to the receiver portion RC of the transponder TP provided in the vehicle V, hopefully still in the zone of the LJ antenna network. The vehicle-equipped transponder TP then starts its vehicle identification coded radio pulse tracking signal transmissions at 8 from its transmitter TX, for enabling tracking by the recovery vehicle (police patrol) 9 with its direction-finding equipment shown as the roof antennas—all as described in said patents.

In accordance with the present invention, in order to obtain greater geographic coverage than the limited number of radio-tracking networks LJ will permit, a novel use is made of the much wider geographically spread existing cellular telephone tower networks, indicated at GSM in FIG. 1—two shown to the left, and one on the right—and all operated at a very higher UHF frequency band. To use this supplemental GSM network for the purposes of the invention, the vehicle V is also equipped with a cellular telephone transceiver TR comprising a receiver "GSM RC" and a transmitter "GSM TX" on cellular radio frequencies.

In addition to sending the uplink early warning at 1 to the radio vehicle-recovery network towers LJ, the uplink message is also sent at $1^1$ to be received over a much wider geographical area by the copious cellular network towers, as at the right-hand tower GSM in FIG. 1, which may also alert the control center.

Supplemental to the before-described control center instruction to the LJ network to query the stolen vehicle transponder TP via its VHF frequency, the control center also instructs the cellular telephone tower network at 4 to query the vehicle via its UHF frequency cellular telephone GSM network.

The control center thus instructs the cellular network to query the vehicle via the cellular telephone GSM network at the same time it instructs the LJ network to query the vehicle tracking transponder TP. The GSM network therefore calls (along path $5^1$) the vehicle cellular telephone receiver GSM RC, while the LJ network queries the vehicle transponder TP. The vehicle GSM TX cellular network transmitter responds along 6, sending its unique identification (ID) transmission via the cellular GSM network. The cellular tower of the GSM network that receives the transmission 6, responds to the control center CC by giving the control center (along 7) a unique identification number of its cell site, thereby identifying the actual transmitting cellular telephone site which received the unique ID transmission, an thus the coarse location region of the vehicle V. This may be near the LJ network or just out of range or geographically quire distant therefrom. At the same time, the tracking transponder TP simultaneously begins transmitting its unique reply tracking code over the LJ VHF network. The control center may, helpfully, provide the tracking vehicle 9 with the coarse or rough location of that identified cellular GSM tower to re-position and then to track on the vehicle transponder for fine position location.

Once the control center knows the coarse or rough location or area of the stolen vehicle, the security vehicle equipped with a tracker can be directed to the area where the stolen vehicle resides. It will then receive the transponder tracking signal from the stolen vehicle and can lock on and track and recover the stolen vehicle. Once the vehicle is recovered, a de-activation signal may be sent via the GSM network at 10, to reset the whole sequence.

Figure 2:
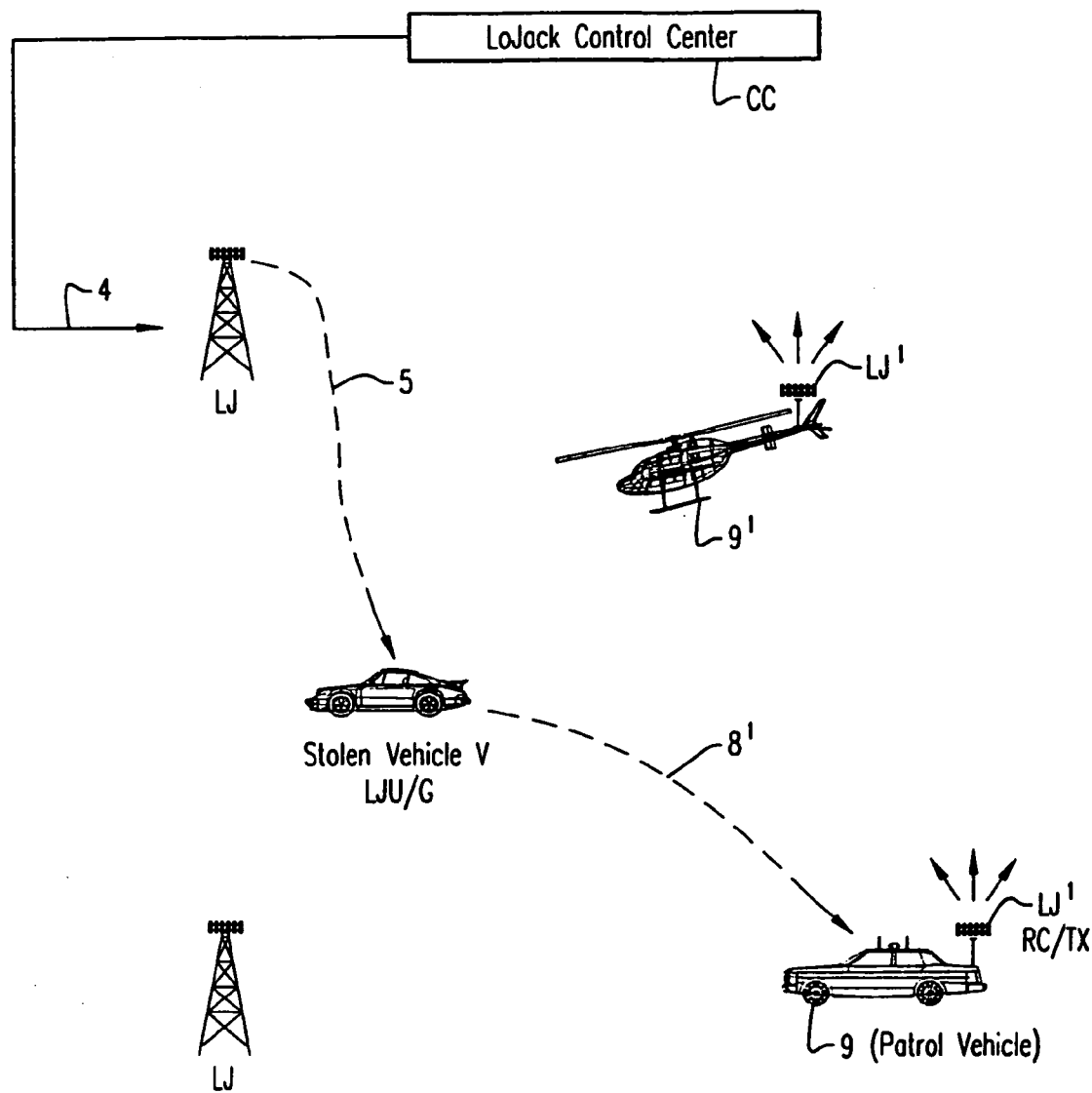
FIG. 2 is a diagram of a modification.

The use of the more copious and wider-spread geographically distributed cellular GSM networks to supplement activation on vehicle theft and recovery operations providing coarse location—for ultimate fine LJ recovery network homing-in—may also extend far beyond any LJ recovery network range of coverage. Since, in such event, the control center can still identify a specific GSM cellular tower that receives vehicle signals via the supplemental GSM TX of the transceiver TR, it provides a tracking vehicle with a rough or coarse vehicle location or area region. The tracking vehicle—ground-based such as a police patrol vehicle 9, FIG. 2, or an aircraft, such as a helicopter $9^1$—may thus be informed by the control center of the coarse location region identified by the cellular GSM network so that the recovery vehicle may proceed to that region. By equipping the recovery vehicle 9 or $9^1$ itself with a portable LJ transmitter tower LJ1 of its own, FIG. 2, fine tracking may achieved outside the fixed LJ networks—a result that is no longer limited by the few LJ recovery network locations.

Further modifications will occur to those skilled in this art and such are considered to fall within the spirit and scope of the invention as defined in the appended claims.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:

1. A method utilizing the relatively wide-geographically spread cellular radio networks to supplement more limited stolen vehicle recovery radio network sites in activation of radio tracking and recovery of such a vehicle, that comprises:
   equipping the vehicle with both a transponder activated to transmit a code transmission and a transceiver responsive to a query from the cellular network;
   upon confirming vehicle theft at a control center, instructing the recovery network and the cellular network at the same time to send their respective queries to the vehicle to enable vehicle recovery via the cellular network as a supplement to the stolen vehicle recovery network to enlarge the effective area of recovery activation.

2. The method of claim 1 in which the transponder is activated via the recovery network.

3. A system for utilizing the wide-geographically spread cellular radio networks to supplement more limited stolen vehicle recovery radio network sites in activation of radio tracking and recovery of such a vehicle, the system having, in combination:
   a vehicle-equipped transponder activated to transmit a code transmission;
   a vehicle-equipped transceiver responsive to a query from such a cellular network; and
   a control center, operable upon confirming vehicle theft, for instructing both the recovery network and the cellular network at the same time to send respective queries to the vehicle to enable recovery via the cellular network as a supplement to the stolen vehicle recovery network to enlarge the effective area of recovery activation.

4. The system of claim 3 in which the transponder is activated via the recovery network.

5. A dual mode vehicle recovery system comprising:
   a transponder located in a vehicle and activated by a signal transmitted by a stolen vehicle recovery radio network to provide a code transmission to be received by a recovery vehicle;
   a cellular telephone transceiver in the vehicle configured to provide said signal to the transponder upon receipt of a query transmitted by a cellular telephone network to activate the transponder when it is out of range of the stolen vehicle recovery network;
   the cellular telephone transceiver in the vehicle, upon receipt of the query, configured to transmit an identification transmission to a cellular tower to provide course location information of the vehicle.

6. A method of recovering a vehicle using two modes, the method comprising:
   hiding in the vehicle a transponder activated by a signal transmitted by a stolen vehicle recovery radio network to provide a code transmission to be received by a recovery vehicle;
   including in the vehicle a cellular telephone transceiver configured to provide said signal to the transponder upon receipt of a query transmitted by a cellular telephone network to activate the transponder when it is out of range of the stolen vehicle recovery network;
   upon receipt of the query, transmitting by the cellular telephone transceiver in the vehicle, an identification transmission to a cellular tower to provide course location information of the vehicle.

* * * * *